United States Patent [19]
Lahtinen

[11] Patent Number: 4,608,106
[45] Date of Patent: Aug. 26, 1986

[54] PROCEDURE FOR MANUFACTURING ELONGATED GLUED BEAMS

[76] Inventor: Pentti K. Lahtinen, 5220 Sunset Trail, Marietta, Ga. 30067

[21] Appl. No.: 715,273

[22] Filed: Mar. 25, 1985

[51] Int. Cl.[4] .......................... B27D 1/10; B32B 31/20
[52] U.S. Cl. .................................... 156/182; 156/258; 156/267; 156/273.3; 156/275.7; 156/304.5; 156/307.5; 156/558
[58] Field of Search ...................... 156/558, 559, 304.5, 156/182, 258, 267, 273.3, 273.5, 275.5, 275.7, 307.5, 380.9

[56] References Cited

U.S. PATENT DOCUMENTS

| | | | |
|---|---|---|---|
| 2,729,584 | 1/1956 | Foster | 156/558 |
| 3,133,850 | 5/1964 | Alenius | 156/558 |
| 3,970,497 | 7/1976 | Glover et al. | 156/267 |
| 4,466,856 | 8/1984 | Paakki | 156/558 |

*Primary Examiner*—Michael Wityshyn
*Attorney, Agent, or Firm*—Browdy and Neimark

[57] ABSTRACT

A procedure for manufacturing elongated glued beams by gluing veneers in their grain direction after each other and upon each other. The veneer ends are cut obliquely so that the glue bond area will be large enough in view of adhesion, whereafter the veneer strips joined by gluing at their ends are glued to each other to form a beam.

1 Claim, 3 Drawing Figures

PROCEDURE FOR MANUFACTURING ELONGATED GLUED BEAMS

The present invention concerns a procedure for manufacturing elongated glued beams by gluing veneers in their grain direction after each other and upon each other.

Wood is an excellent construction material because of its light specific weight and good strength properties. However, there are limitations in certain more demanding applications which are caused by the nonuniform structure of wood, such as the natural defects in the lumber. Also the product dimensions are determined by the log size. This is why the lumber needs to be selected carefully, and overdimensioning is needed in structural applications. Attempts are being made to overcome these drawbacks by detecting the defaults and eliminating them by finger-jointing and laminating techniques. However, even this procedure does not utilize the best properties of wood, such as good tensile strength, in the best possible way.

The object of the invention is to manufacture, by a method of new type, elongated glued beams. The procedure of the invention is characterized in that the ends of the veneers are cut obliquely so that the glue bond area will be large enough in view of adhesion, whereafter the veneer strips joined by gluing at their ends are glued upon each other to form a beam. By producing a laminated veneer lumber plank of carefully selected veneers, which have been scarf-jointed in a well controlled automatic operation, we can best meet the optimum natural characteristics of the wood. The production line is based on a new veneer scarfing and handling technology and expertise, as well as on a new pressing technology and expertise.

In the production process the conventional size veneers are scarf-jointed to form veneer sheets of required lengths. The sheets are then glue spread and laid up to form a lay-up of certain thickness. The plank is pressed in a hot press, and trimmed and sawn to the required sizes.

The laminated veneer lumber can also be produced in a continuous process. However, in this concept the scarf-jointing can not be controlled well enough. The continuous process is limited to the capacity of the one press opening. Expensive glue additives must be used to speed up the process. A benefit to the continuous process is the free choice of custom lengths. This can also be achieved in a long multi-opening press, where the length of the pressed panels can be chosen to meet the customer's demands without resulting in cutting leftovers.

Figure 1:
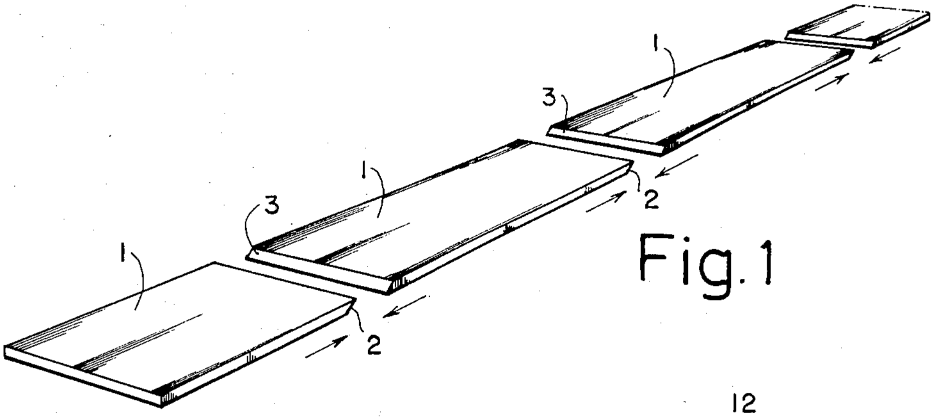

The invention is described in the following with the aid of an example, referring to the attached drawing, wherein FIG. 1 presents the joining to each other of the veneer ends.

Figure 2:
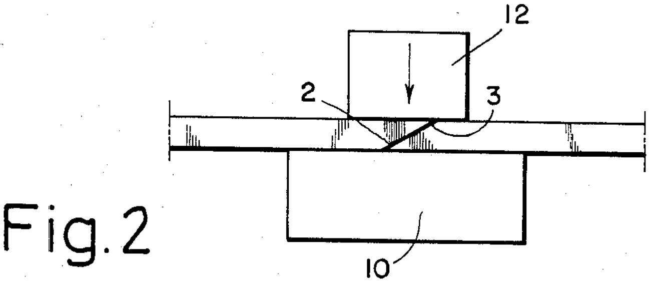

FIG. 2 presents the pressing together of the veneer ends.

Figure 3:
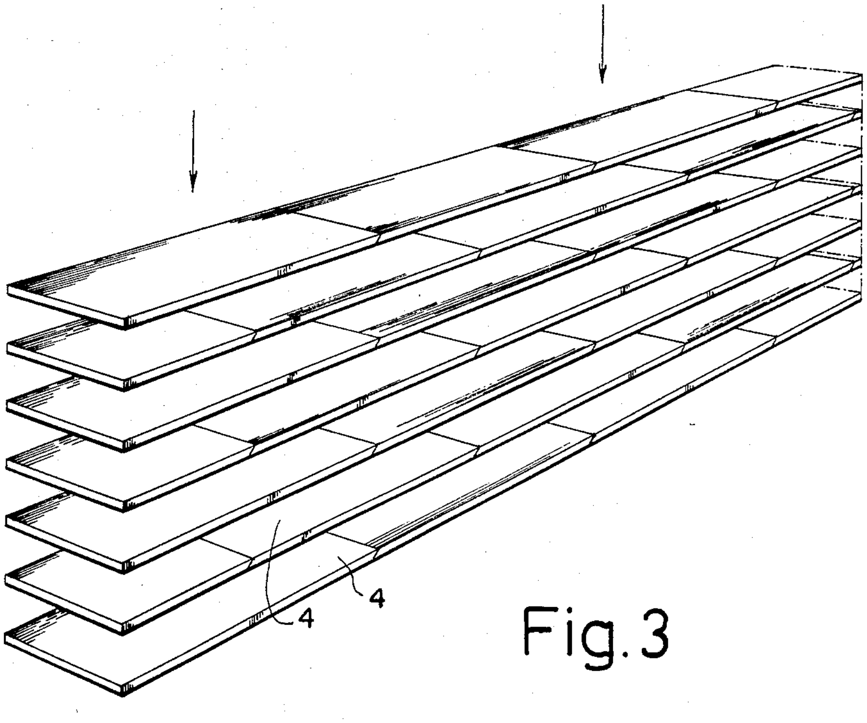

FIG. 3 presents the joining to each other of veneers to constitute a glued beam.

The veneers 1 are fed from stacks by vacuum feeders to the scarfing line. The veneers in the individual stacks can be of different quality and thickness. The feeding is controlled by computer logic. The scarfing of veneers is done in the scarfing saw, where the scarfing wedge ratio varies from 1:10 to 1:6 thereby providing the veneers with beveled ends 2 and 3. The computer control always chooses the correct ratio based on the veneer thickness. In the same machine the glue is spread on the scarf or beveled ends 2, 3. The glue strand is dried and preheated with infrared heaters in order to shorten the scarf-joint pressing time. The computer control selects the veneers to each scarf-jointing line according to the veneer quality and thickness. At this state of the process the operator can control the quality of veneer sheets, extract faulty sheets and order new ones from the computer. The scarfed ends 2, 3 of the veneers are automatically positioned over each other to form a perfect scarfing-joint in the press (FIG. 2) which includes a support element 10 and a movable element 12. One side of the scarf-jointed veneer is straight and the other one is trimmed by a trimming saw. The scarf-jointed veneer sheets are cut to the required lengths. From the cutter, the scarf-jointed veneers are transferred to a buffer station. The computer control guides the scarf-jointed veneers, in the correct order, to the gluing machine. The conveyor has an over-turner for turning down the tight side of the veneer if needed. The glue is spread on the upper surface 4 of the scarf-jointed veneer sheets, for example, by spraying or foam extrusions. The scarf-jointed, glued veneer sheets are laid up on a flexible caul exactly in the correct position by side shifter forks. After the glue has been spread on the scarf-jointed veneer sheets' surfaces, the waiting time before pressing (FIG. 3) of the stack is limited. Standing unpressed for too long a time, the glue will dry and will not form a good glue joint in the press. After prepressing, the lay-up goes to the infeeder of the press on the flexible caul. When the pressing is completed and the press opens, pulling bars enter the press and the laminated veneer lumber planks are pulled out on the flexible cauls. Simultaneously the same bars pull the lay-ups from the infeeder to the press. From the outfeeder the flexible cauls are conveyed back under the pressline to the lay-up station.

I claim:

1. A method for manufacturing elongated glued beams from veneer strips, comprising
   - feeding a series of veneers to a scarfing line from veneer stacks using vacuum feeders;
   - scarfing the leading and trailing ends of each veneer in its grain direction with a scarfing saw to provide a consistent scarfing wedge ratio lying within the range of 1:10 to 1:6, and thereby providing a plurality of veneers having ends beveled to the same angle;
   - spreading glue on the beveled ends of the veneers, drying said glue and pre-heating said glue with infra red heaters;
   - controlling the movement of said veneers according to veneer quality and thickness, and to extract faulty sheets of veneer;
   - passing adjacent veneers arranged end to end to a press, positioning beveled overlapping veneer ends over a fixed press support element, and moving an upper movable element downwardly to effect pressing and laminating of said overlapping veneer ends and provide scarf-jointing thereof;
   - trimming one side of the resultant scarf-jointed veneer using a trimming saw;
   - cutting the scarf-jointed veneer sheets to desired lengths;
   - transferring the resultant scarf-jointed veneer sheets to a buffer station;

guiding a plurality of scarf-jointed veneers, in correct order, to a glueing machine;

spreading glue on the upper surface of a plurality of said scarf-jointed veneer sheets, and laying said scarf-jointed glued veneer sheets on a flexible caul in a vertically stacked position, using side shifter forks, to obtain a vertical stack of scarf-jointed glued veneer sheets with the scarf-joints thereof being vertically staggered from one another;

pre-pressing said vertical stack of scarf-jointed glued veneer sheets;

passing the pre-pressed stack to the end feeder of a press on a flexible caul;

pressing the pre-pressed stack to effect lamination and thereby form laminated veneer lumber planks; and opening the press, extending pulling bars into the press and pulling the laminated veneer lumber planks out on the flexible caul.

* * * * *